United States Patent
Strohrmann et al.

(10) Patent No.: US 6,581,447 B1
(45) Date of Patent: Jun. 24, 2003

(54) METHOD FOR DETERMINING THE AIR ASPIRATED BY AN INTERNAL COMBUSTION ENGINE, AND SENSOR FOR AN INTERNAL COMBUSTION ENGINE

(75) Inventors: Manfred Strohrmann, Karlsruhe (DE); Wolfgang Mueller, Rutesheim (DE); Uwe Konzelmann, Asperg (DE); Piet-Christiaan Mussert, Wolfsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/331,016

(22) PCT Filed: Aug. 14, 1998

(86) PCT No.: PCT/DE98/02354

§ 371 (c)(1),
(2), (4) Date: Jun. 15, 1999

(87) PCT Pub. No.: WO99/25971

PCT Pub. Date: May 27, 1999

(30) Foreign Application Priority Data

Nov. 14, 1997 (DE) .......................................... 197 50 496

(51) Int. Cl.$^7$ .............................................. G01M 19/00
(52) U.S. Cl. ...................................................... 73/118.2
(58) Field of Search ............................. 73/118.2, 116, 73/3, 118.1

(56) References Cited

U.S. PATENT DOCUMENTS 5,267,467 A  * 12/1993  Caron ........................ 73/118.2

FOREIGN PATENT DOCUMENTS

| DE | 1543042 | * | 2/1975 |
| JP | 58117333 | * | 7/1983 |
| JP | 58155247 | * | 9/1983 |
| JP | 03262923 | * | 11/1991 |

* cited by examiner

Primary Examiner—William Oen
Assistant Examiner—Maurice Stevens
(74) Attorney, Agent, or Firm—Ronald E. Greigg

(57) ABSTRACT

In a method for determining the air aspirated by an internal combustion engine, in which the air flow rate is detected by an air flow rate meter, simultaneously with the detection of the air flow rate, the humidity and/or pressure of the air is detected by a humidity and/or pressure sensor and evaluated in an evaluation circuit.

10 Claims, 3 Drawing Sheets

METHOD FOR DETERMINING THE AIR ASPIRATED BY AN INTERNAL COMBUSTION ENGINE, AND SENSOR FOR AN INTERNAL COMBUSTION ENGINE

PRIOR ART

The invention relates first to a method for determining the air aspirated by an internal combustion engine, in which the air flow rate is detected by an air flow rate meter.

It has long been known that the air flow rate aspirated by an internal combustion engine of a motor vehicle can be detected by means of an air flow rate meter. The air flow rate detected is processed in an engine control unit together with other data relevant to the combustion process, such as the temperature of the intake tube pressure, for calculating injection times and the like.

One problem in such known methods for determining the air aspirated by an internal combustion engine is that in determining the air flow rate, variables that effect the air flow rate are ignored. One such variable that changes the air flow rate is the humidity, for instance. If the ambient air is very humid, the humidity makes the air flow rate detected by the air flow rate meter wrong, because not only the air that can be combusted in the engine but at the same time water vapor that cannot be combusted is detected and thus leads to very disadvantageous changes in emissions values.

It is therefore the object of an invention to refine a method for determining the air aspirated by an internal combustion engine, in such a way that only the air that can be combusted by the engine is precisely detected.

ADVANTAGES OF THE INVENTION

In a method for determining the air aspirated by an internal combustion engine, as described at the outset, this object is attained according to the invention in that simultaneously with the detection of the air flow rate, the humidity is detected by a humidity sensor and evaluated in an evaluation circuit. Additionally detecting and evaluating the humidity of the aspirated air has the particularly great advantage that the flow rate of gaseous water aspirated can be distinguished from the flow rate of the air that can be combusted in the engine. As a result, the control circuit of the engine can be supplied with substantially more-precise initial data, and as a consequence, substantially more-precise load signals and other signals determining the combustion process can be calculated and output.

The humidity of the aspirated air can be detected purely in principle in the most various ways. One advantageous embodiment provides that the humidity is detected in an intake tube of the engine, preferably adjacent to the air flow rate meter. As a result, a very precise determination of the humidity of the aspirated air is possible.

In another highly advantageous embodiment, it is provided that the humidity is detected outside an intake tube of the engine. As a result, the detected moisture in the ambient air can also be used for other vehicle-specific purposes. For instance, it is conceivable that if a certain humidity level is exceeded, the windshield wipers, lights or other equipment is automatically turned on.

Furthermore, it can advantageously be provided that in addition, the intake tube pressure is simultaneously detected and evaluated by the evaluation circuit. This increases the precision of the determination of the aspirated air.

It is preferably provided that the intake tube pressure is detected in the intake tube adjacent to the air flow rate meter.

The invention has the further object of improving a sensor for an internal combustion engine, including an air flow rate meter with a sensor element for detecting the aspirated air flow rate, in such a way that along with the air flow rate, the humidity and/or the intake tube pressure is also detectable in a simple way.

In a sensor for an internal combustion engine, including an air flow rate meter with a sensor element for detecting the aspirated air flow rate, is attained according to the invention.

Such a sensor has the particularly great advantage that along with the air flow rate, its moisture and pressure are not only detected but also already processed in the sensor. By means of such a sensor, because of the evaluation circuit disposed in it, the detected data can advantageously be forwarded to a control circuit over only a few connection lines. Such a sensor is therefore especially suitable for connection to a bus system, which requires only two data lines. Such a sensor can also be very compact in construction.

Thus, in an advantageous embodiment, it is for instance provided that the air flow rate meter or the sensor element and the pressure sensor are micromechanical components. It may be provided that the sensor element of the air flow rate meter and the pressure sensor are disposed on a chip or a chiplike ceramic component, which not only results in an especially small structural form but also in particular assures that both the air flow rate and the humidity are detected at practically the same location. In another advantageous embodiment, it is provided that the air flow rate meter or its sensor element and the pressure sensor are disposed on two chips spaced apart from one another. In that case, the pressure measurement can then be done via a certain predeterminable transit path, for instance inside the air flow rate meter tube.

BRIEF DESCRIPTION OF THE DRAWINGS

Further characteristics and advantages of the invention are the subject of the ensuing description and of the views in the drawing of several exemplary embodiments.

Shown in the drawings are.

DESCRIPTION OF THE EXEMPLARY EMBODIMENTS

Figure 1:
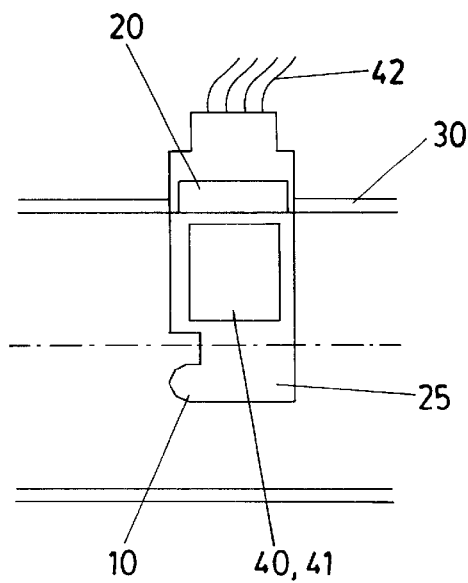
FIG. 1, a first exemplary embodiment for a sensor of an internal combustion engine that makes use of the invention.

In FIG. 1, a combination of an air flow rate meter 10, known per se, and a humidity sensor 20, known for instance from German Patent Disclosure DE 38 29 517 A1, which are disposed in an intake tube 30 of an internal combustion engine, is shown. In the exemplary embodiment shown in FIG. 1, the air flow rate meter 10 and the humidity sensor 20 are the subject of a single housing (25), in which an electronic evaluation circuit, made by hybrid technology, for instance, is accommodated, which circuit evaluates the data detected by the air flow rate meter 10 and the humidity sensor 20 and outputs it over lines 42, for instance to a control unit (not shown in FIG. 1).

Figures 2A, 2B:
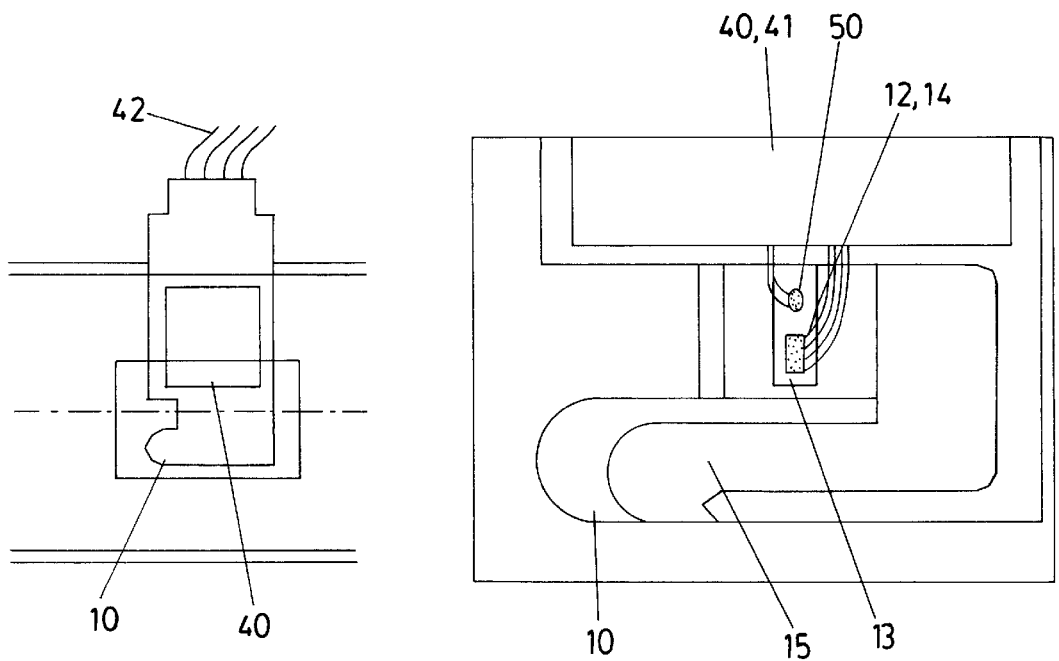
FIGS. 2A and 2B, a further exemplary embodiment of a sensor for an internal combustion engine that makes use of the invention.

As FIGS. 2A and 2B show in further detail, the air flow rate meter 10 has a temperature-sensitive sensor means 14, which is embodied as a micromechanical component. An air flow rate meter equipped with such a sensor element is known to one skilled in the art from German Patent DE 44 07 209 C2, whose disclosure is hereby expressly incorporated in the present patent application. It is understood that the air flow rate meter 10 may also be embodied as a so-called hot film air flow rate meter, which as its sensor element has a chiplike ceramic substrate provided with temperature-dependent resistance layers, as disclosed for instance in German Patent Disclosure DE 36 38 138 A1.

By means of the simultaneous detection of the humidity, the portion of the aspirated air that is combustible by the engine can be distinguished, in the detected air flow rate, from water in a gaseous state. This substantially increases the precision of calculating the load signal, for instance, since it is possible to take into account only the air components detected.

As seen from FIG. 1, the humidity sensor 20 can be disposed together with the air flow rate meter 10 and the evaluation circuit 41 in a housing 25.

Figure 3:
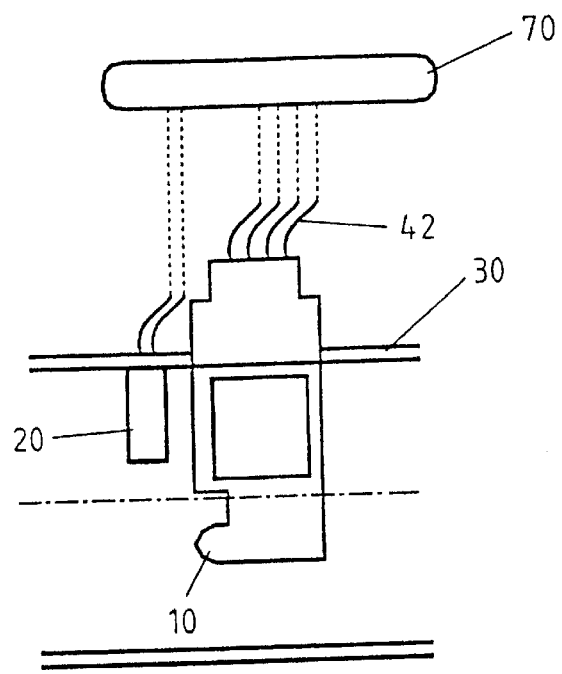
FIG. 3, schematically, illustrates a combination of an air flow rate meter and a humidity sensor for the simultaneous detection of the air flow rate and the humidity of the air aspirated by an internal combustion engine, in one embodiment of the method of the invention.

However, it is also possible, as shown in FIG. 3 to detect the humidity with a humidity sensor 20 disposed in the intake tube 30 outside the actual air flow rate meter; the data output by the air flow rate meter 10 and the humidity sensor 20 are delivered to a control unit 70 and processed.

Figure 4:
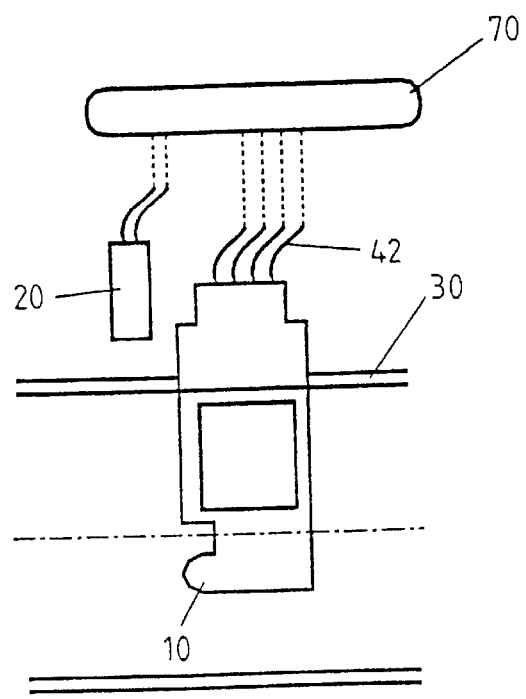
FIG. 4, schematically, illustrates a combination of an air flow rate meter and a humidity sensor for the simultaneous detection of the air flow rate and the humidity of the air aspirated by an internal combustion engine, in one embodiment of the method of the invention.

Furthermore, the humidity sensor 20 can even be disposed outside the intake tube 30. In that case, it can be used for other control purposes of the vehicle, such as for automatically turning on the windshield wipers or the lights or the like (see FIG. 4).

Figure 5:
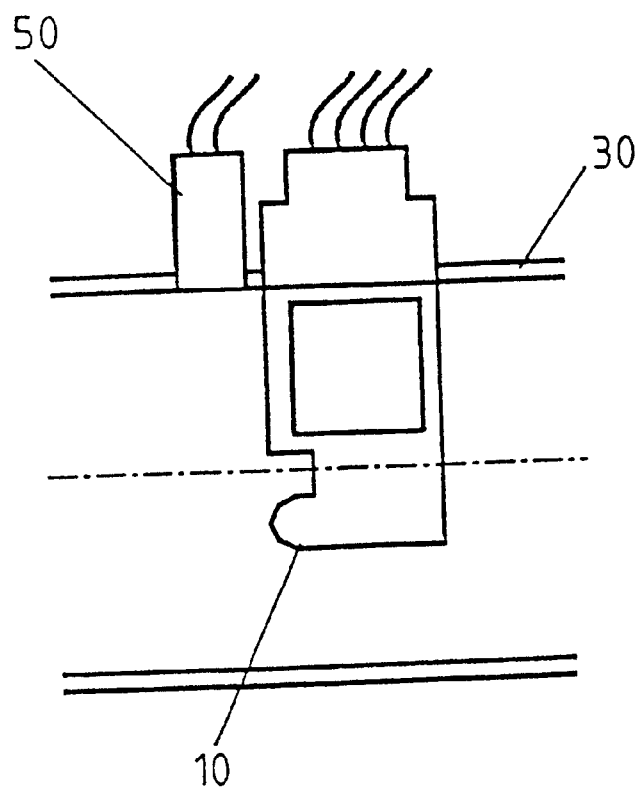
FIG. 5, schematically, illustrates a combination of an air flow rate meter and a humidity sensor for the simultaneous detection of the air flow rate and the humidity of the air aspirated by an internal combustion engine, in one embodiment of the method of the invention.

Along with the humidity sensor 20 disposed in the housing 25 of the air flow rate meter 10, a pressure sensor 50 can also be provided, as seen in FIGS. 2A and 2B. Both the pressure sensor 50 and the actual air flow rate meter 12, or its sensor element 14, can be embodied as micromechanical components, which are disposed on a common chip 13 or ceramic substrate, for instance in a bypass conduit 15 of the air flow rate meter 10. However, it is furthermore also possible for the pressure sensor 50 to be disposed outside the air flow rate meter 10 in the intake tube 30, as seen from FIG. 5. The pressure sensor can also comprise a micromechanical component or can be constructed in a manner known per se, for instance from German Patent Disclosure DE 43 17 312 A1.

It is understood that the combination of an air flow rate meter 10, or its sensor element 14, and a pressure sensor 50 as shown in FIG. 2 can also be combined with a humidity sensor 20, in the manner described in conjunction with FIG. 1. In that case, the sensor for the engine then has an air flow rate meter 10, a humidity sensor 20 and a pressure sensor 50, and this sensor is disposed together with an evaluation circuit in a common housing.

The sensor element 14 of the air flow rate meter 10, the humidity sensor 20 and the pressure sensor 50 can also all be applied to a common chip or ceramic substrate, which is preferably located in the bypass conduit 15 of the air flow rate meter 10.

The foregoing relates to preferred exemplary embodiments of the invention, it being understood that other variants and embodiments thereof are possible within the spirit and scope of the invention, the latter being defined by the appended claims.

We claim:

1. A sensor for an internal combustion engine, including an air flow rate meter (10) with a sensor element (14) for detecting an aspirated air flow rate in an intake tube (30) of the engine, in which adjacent to the air flow rate meter (10) or an air flow rate sensor element (14), a humidity sensor (20) and a pressure sensor (50) and also an common evaluation circuit (41), for processing a data output by the air flow rate meter (10) or the air flow rate sensor element (14), the humidity sensor (20) and the pressure sensor (50), are provided and are disposed in a single housing (25).

2. The sensor according to claim 1, in which the sensor element (14) of the air flow rate meter (10) and the pressure sensor (50) are micromechanical components.

3. The sensor according to claim 2, in which the sensor element (14) of the air flow rate meter (10) and the pressure sensor (50) are disposed on a chip (13).

4. The sensor according to claim 1, in which the sensor element (14) of the air flow rate meter (10) and the pressure sensor (50) are each disposed on a separate chip spaced apart from one another.

5. A method for determining an air flow aspirated by an internal combustion engine, which comprises the steps of detecting an air flow rate by an air flow rate meter (10), and simultaneously with a detection of the air flow rate, detecting a humidity of the air by a humidity sensor (20) and detecting an intake tube pressure of the air by a pressure sensor (50) and simultaneously evaluating signals of the air flow rate, the humidity, and the intake tube pressure in a common evaluation circuit (41).

6. The method according to claim 5, comprising the step of detecting the intake tube pressure in the intake tube (30) adjacent to the air flow rate meter (10).

7. A method for determining an air flow aspirated by an internal combustion engine, which comprises the steps of detecting an air flow rate by an air flow rate meter (10), and simultaneously with a detection of the air flow rate, detecting a humidity of the air by a humidity sensor (20) in an intake tube (30) of the engine, adjacent to the air flow rate meter (10), and detecting an intake tube pressure of the air by a pressure sensor (50) and simultaneously evaluating signals of the air flow rate, the humidity, and the intake tube pressure in a common evaluation circuit (41).

8. The method according to claim 7, comprising the step of detecting the intake tube pressure in the intake tube (30) adjacent to the air flow rate meter (10).

9. A method for determining an air flow aspirated by an internal combustion engine, which comprises the steps of detecting an air flow rate by an air flow rate meter (10), and simultaneously with a detection of the air flow rate, detecting a humidity of the air outside an intake tube (30) of the engine by a humidity sensor (20) and detecting an intake tube pressure of the air by a pressure sensor (50) and simultaneously evaluating signals of the air flow rate, the humidity, and the intake tube pressure in a common evaluation circuit (41).

10. The method according to claim 9, comprising the step of detecting the intake tube pressure in the intake tube (30) adjacent to the air flow rate meter (10).

* * * * *